US010689287B2

(12) United States Patent
Du et al.

(10) Patent No.: US 10,689,287 B2
(45) Date of Patent: Jun. 23, 2020

(54) METHOD FOR EFFICIENTLY PREPARING DOPED OPTICAL FIBRE PREFORM AND DOPED OPTICAL FIBRE PREFORM

(71) Applicant: FIBERHOME TELECOMMUNICATION TECHNOLOGIES CO., LTD, Wuhan (CN)

(72) Inventors: Cheng Du, Wuhan (CN); Wenyong Luo, Wuhan (CN); Lei Yan, Wuhan (CN); Tao Zhang, Wuhan (CN); Chao Chen, Wuhan (CN); Yili Ke, Wuhan (CN); Ming Kong, Wuhan (CN); Jie Zhang, Wuhan (CN); Zhijian Liu, Wuhan (CN); Lifeng Liu, Wuhan (CN)

(73) Assignee: FIBERHOME TELECOMMUNICATION TECHNOLOGIES CO., LTD, Wuhan (CN)

( * ) Notice: Subject to any disclaimer, the term of this patent is extended or adjusted under 35 U.S.C. 154(b) by 296 days.

(21) Appl. No.: 15/769,342

(22) PCT Filed: Oct. 21, 2016

(86) PCT No.: PCT/CN2016/102796
§ 371 (c)(1),
(2) Date: Apr. 19, 2018

(87) PCT Pub. No.: WO2017/181636
PCT Pub. Date: Oct. 26, 2017

(65) Prior Publication Data
US 2018/0305237 A1      Oct. 25, 2018

(30) Foreign Application Priority Data
Apr. 21, 2016   (CN) .......................... 2016 1 0251260

(51) Int. Cl.
*C03B 37/012* (2006.01)
*C03B 37/018* (2006.01)

(52) U.S. Cl.
CPC .... *C03B 37/01838* (2013.01); *C03B 37/0183* (2013.01); *C03B 37/01248* (2013.01);
(Continued)

(58) Field of Classification Search
CPC .............................................. C03B 37/01294
See application file for complete search history.

(56) References Cited

U.S. PATENT DOCUMENTS

2007/0145332 A1   6/2007   Koeppler et al.
2010/0251771 A1*  10/2010  Langner ................. C03B 19/06
                                                                65/30.1
2015/0197688 A1*  7/2015   Such .................... C09K 11/7706
                                                                252/301.4 F

FOREIGN PATENT DOCUMENTS

CN     1490267 A    4/2004
CN     1629664 A    6/2005
(Continued)

*Primary Examiner* — Cynthia Szewczyk
(74) *Attorney, Agent, or Firm* — Bayramoglu Law Offices LLC

(57) ABSTRACT

A method for preparing a doped optical fibre preform includes formulating, a rare earth material or a functional metal material and a co-doping agent into a doping solution, mixing a high-purity quartz powder with the doping solution, drying same at a temperature of 100° C.-150° C. for 12-48 hours, crushing and screening the same to obtain a doped quartz powder; depositing the doped quartz powder onto the surface of a target rod to form a doped core layer; replacing the doped quartz powder with the high-purity quartz powder, and depositing the high-purity quartz powder onto the surface of the doped core layer to form a quartz outer cladding; and removing the target rod, and gradually collapsing the entirety formed from the doped core layer and
(Continued)

the quartz outer cladding at a high temperature to obtain the doped optical fibre preform.

12 Claims, 3 Drawing Sheets

(52) U.S. Cl.
CPC .. *C03B 37/01294* (2013.01); *C03B 37/01869* (2013.01); *C03B 37/01237* (2013.01); *C03B 2201/28* (2013.01); *C03B 2201/30* (2013.01); *C03B 2201/31* (2013.01); *C03B 2201/36* (2013.01); *C03B 2201/40* (2013.01); *C03B 2201/50* (2013.01); *C03B 2201/54* (2013.01); *C03B 2201/58* (2013.01); *Y02P 40/57* (2015.11)

(56) References Cited

FOREIGN PATENT DOCUMENTS

| | | |
|---|---|---|
| CN | 102875019 A | 1/2013 |
| CN | 103224325 A | 7/2013 |
| CN | 103848565 A | 6/2014 |
| CN | 105837025 A | 8/2016 |
| JP | 2005255502 A | 9/2005 |

\* cited by examiner

METHOD FOR EFFICIENTLY PREPARING DOPED OPTICAL FIBRE PREFORM AND DOPED OPTICAL FIBRE PREFORM

CROSS REFERENCE TO RELATED APPLICATIONS

This application is the national phase entry of International Application No. PCT/CN2016/102796, filed on Oct. 21, 2016, which claims priority from the Chinese patent application no. 201610251260.5 filed on Apr. 21, 2016, the entire contents of which are incorporated herein by reference.

TECHNICAL FIELD

The invention relates to the field of optical fibre preforms, in particular to a method for efficiently preparing a doped optical fibre preform and a doped optical fibre preform.

BACKGROUND

The laser technique can introduce higher quality and precision to value chains and is an important means to promote the upgrade of the industrial structure of the manufacturing industry. In the laser application field, optical fibre lasers characterized by high conversion efficiency, good heat dissipation performance and stability and the like have become one of the mainstream lasers. Similar to other diode pumped lasers, the optical fibre lasers adopt pump light to achieve a high power density in optical fibres, so that laser-level population inversion of laser operating substances is generated, and oscillatory laser output can be achieved by properly adding a positive feedback circuit (constituting a resonant cavity). The optical fibre lasers essentially convert low-quality pump laser light into high-quality laser light output, and the high-quality laser light output can be applied to various fields such as the medical field, the material processing field and the laser weapon field.

At present, the rare earth doped optical fibre serving as the core component of the optical fibre lasers is the key factor determining the laser characteristic of the optical fibre lasers. Rare earth doped optical fibre preforms are prepared mainly through the porous layer liquid-phase doping method, the sol-gel method, the high-temperature flashing method, and the direct nanoparticle deposition method. However, all existing techniques cannot overcome the defects of poor doping uniformity of rare earth particles in optical fibres, high impurity content and the like. In addition, due to process limitations, the core diameter of optical fibre preforms and the doping concentration of rare earth ions are at a low level, and consequentially, the cost of laser optical fibres is high; and meanwhile, usage and system debugging are more difficult, and the requirements for commercialization and industrialization of optical fibre lasers cannot be met.

In the prior art, the rare earth doped optical fibre preforms are prepared mainly through the porous layer liquid-phase doping method, the sol-gel method, the high-temperature flashing method rarely used for experimental studies, and the direct nanoparticle deposition method. As for the sol-gel method and the high-temperature flashing method, equipment requirements are high, and the process is complex. The direct nanoparticle deposition method has high raw material requirements and is not beneficial to large-scale preparation. As for the porous layer liquid-phase doping method which is most widely used currently, a porous core layer is deposited on the inner surface of a quartz deposition tube and then is soaked in a solution containing rare earth elements so that the rare earth elements in the solution can be adsorbed into pores of the porous core layer; afterwards, the deposition tube is disposed on a sintering device to dry the porous core layer with inert gases, and the porous core layer is then sintered into a glass layer; and finally, the deposition tube is collapsed into a solid preform.

The porous layer liquid-phase doping method is complex in process, repeated deposition is needed to obtain a doped fiber core structure meeting drawing requirements, and as the doped fiber core structure has to be taken out of an airtight device between the deposition, soaking and drying procedures, impurities are likely to be introduced, and the laser performance of the rare earth doped optical fibre core is affected; and meanwhile, the local soaking effect of the liquid-phase doping method is inconsistent so that the problem of nonuniform longitudinal doping of preforms cannot be solved, and the longitudinal absorption coefficient of rare earth doped optical fibres is inconsistent, which is not beneficial to nonlinear effect control and batch application. Since the four methods mentioned above are all limited by the internal space of reaction tubes, prepared rare earth doped optical fibre cores are small, the number of optical fibres drawn in each batch is limited, and consequentially, the unit cost of optical fibres is high, and the requirement of the laser market for high-uniformity rare earth doped optical fibres cannot be met.

In the optical communication field, a large number of devices are externally provided with metal ion doped optical fibres, such as high-attenuation optical fibres used as the key materials of optoelectronic devices such as optical fibre attenuators. Similar to the laser optical fibre technique, the high-attenuation optical fibre doping technique has been mastered only by Corative Company in Canada and OptoNet Company in Korea internationally at present. The high-attenuation optical fibre doping technique is based on the porous layer liquid-phase doping method and has the problems of poor doping uniformity and low production efficiency caused by dimension and process limitations of optical fibre preforms.

SUMMARY

To overcome the defects of the related art, the invention provides a method for efficiently preparing a doped optical fibre preform and a doped optical fibre preform. The method is simple in process and can effectively reduce impurity introduction and improve the doping uniformity of optical fibre preforms. The method breaks through dimensional limitations, caused by in-tube deposition, to doped fiber cores and can remarkably improve the production efficiency of doped optical fiber preforms, reduce the development cost of the doped optical fiber preforms and meet the industrialization requirement for laser optical fibres and optical fibres for special communication devices.

The method for efficiently preparing a doped optical fibre preform comprises the following steps:

S1, mixing a rare earth material or a functional metal material with a co-doping agent in a certain proportion, and adding a solvent to formulate a doping solution; evenly mixing a high-purity quartz powder having a purity of over 99% with the doping solution to obtain a doped precursor; drying the doped precursor at a temperature of 100° C.-150° C. for 12-48 hours, crushing the doped precursor, and screening the crushed precursor through a mesh sieve with over 150 meshes to obtain a doped quartz powder.

S2, disposing a target rod in a plasma outward spraying deposition device, introducing the doped quartz powder, oxygen and/or other gaseous co-doping substances into a plasma heating zone in the plasma outward spraying deposition device, and depositing the doped quartz powder onto the surface of the target rod in a certain proportion to form a doped core layer; stopping introduction of the doped quartz powder, introducing the high-purity quartz powder, oxygen and/or other gaseous co-doping substances, and depositing the high-purity quartz powder onto the surface of the doped core layer to form a quartz outer cladding; and S3, removing the target rod, and gradually collapsing the entirety formed from the doped core layer and the quartz outer cladding at a high temperature of 900° C.-1800° C. to obtain the doped optical fibre preform.

Based on the above technical scheme, the rare earth material is at least one of the compounds of ytterbium, thulium, erbium, holmium, dysprosium, terbium, gadolinium, europium, samarium, promethium, neodymium, praseodymium, cerium and lanthanum.

Based on the above technical scheme, the rare earth material is at least one of ytterbium chloride, thulium chloride and erbium chloride.

Based on the above technical scheme, the functional metal material is at least one of the compounds of cobalt, ferrum, calcium, potassium, magnesium, vanadium, germanium and bismuth.

Based on the above technical scheme, the functional metal material is cobalt chloride and/or ferric chloride.

Based on the above technical scheme, the co-doping agent is at least one of aluminum chloride, cerium chloride and ferric chloride.

Based on the above technical scheme, the granularity of the high-purity quartz powder is smaller than 100 μm.

Based on the above technical scheme, other gaseous co-doping substances are hexafluoroethane or phosphorus oxychloride.

Based on the above technical scheme, the solvent in step S1 is water or ethyl alcohol.

The invention further provides a doped optical fibre preform prepared through the method mentioned above.

Based on the above technical scheme, in the doped optical fibre preform, the refractivity of the doped core layer is greater than that of the quartz outer cladding, and the percent of the refractivity difference is 0.1%-1.2%.

Based on the above technical scheme, in the doped optical fibre preform, the ratio of the cross sectional area of the quartz outer cladding to the cross sectional area of the doped core layer is 3.0-1275.5.

Compared with the prior art, the invention has the following advantages:

(1) The doping uniformity is the key performance of optical fibres in the application of laser optical fibres and special optical fibres such as high-attenuation optical fibres. In the invention, the doped precursor is prepared by cladding the surface of high-purity quartz powder particles with dopants, the dopants make full contact with the high-purity quartz powder particles serving as an optical fibre deposition matrix, and thus high-concentration doping of rare earth ions or functional metal ions is achieved. The method is suitable for co-doping various co-doping agents and can effectively avoid the micropore permeability difference of various co-doping agents and dopants in traditional processes and the solution concentration difference caused by the gravity factor in the soaking process, thereby improving the axial doping uniformity.

(2) In the invention, the high-frequency plasma outward spraying technique is adopted to deposit the doped precursor on the target rod, so that a complex multi-pass deposition doping process is avoided, impurity introduction is effectively reduced, and the doping uniformity of the rare earth ions or the functional metal ions in the optical fibre preforms is fundamentally improved. The method is based on an extra-tube deposition technique, thereby being simple in preparation process, capable of breaking through dimension limitations, caused by intra-tube deposition technique, to doped fiber cores, remarkably improving the production efficiency of rare earth-doped optical fibre preforms, reducing the development cost of laser optical fibres, achieving low-cost, efficient and large-scale production of doped optical fibre preforms and meeting the industrialization requirement for laser optical fibres and optical fibres of special communication devices.

In conclusion, the doped precursor is prepared by cladding the surface of the high-purity quartz powder particles with dopants, and the high-frequency plasma outward spraying technique is adopted, so that high-concentration doping of the rare earth ions or the functional metal ions in the optical fibre preform is achieved, and axial doping uniformity is improved. By adoption of the method, the development cost of doped optical fibres can be reduced, core diameters of prepared doped optical fibre preforms are not limited, and efficient, low-cost and large-scale production of laser optical fibres and high-added value special optical fibres such as high-attenuation optical fibres is achieved.

Reference Signs: 1-target rod, 2-doped core layer, 3-quartz outer cladding.

DETAILED DESCRIPTION OF THE EMBODIMENTS

A detailed description of the invention is given with the accompanying drawings and specific embodiments as follows.

Figure 1:
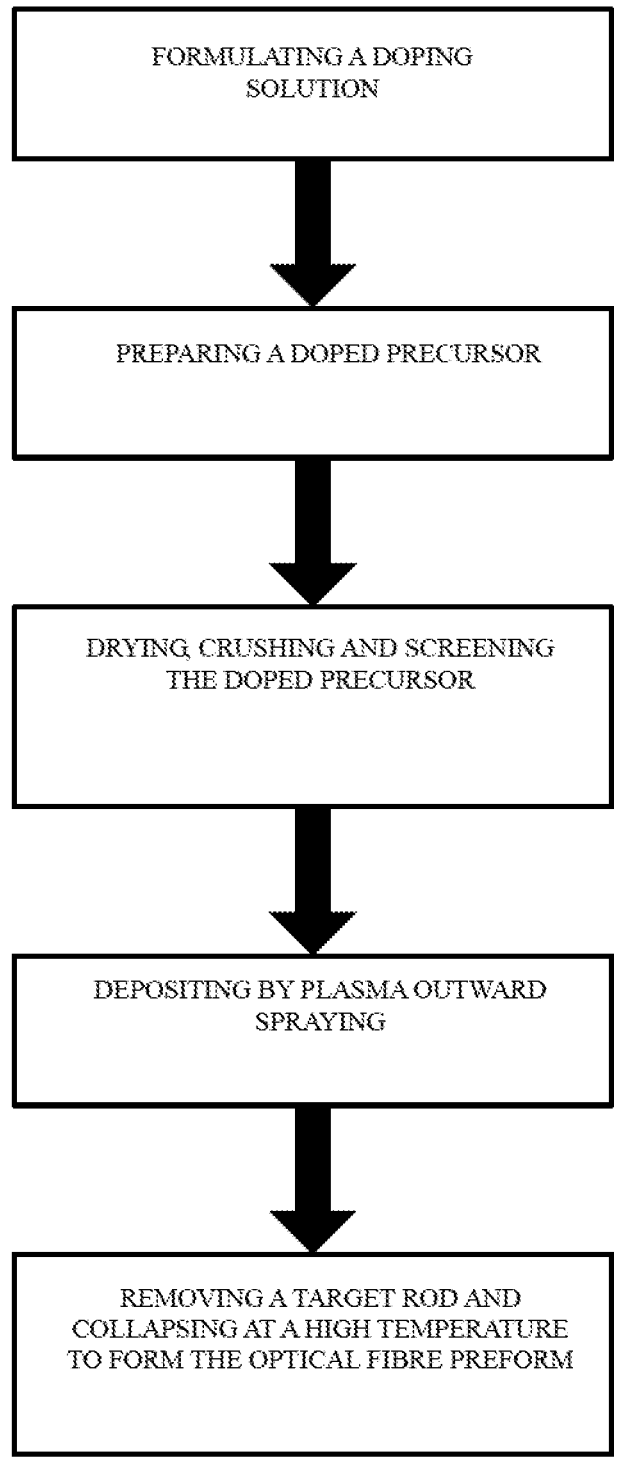
FIG. 1 is a preparation flow diagram of a doped optical fibre preform in one embodiment of the invention.

As is shown in FIG. 1, a method for efficiently preparing a doped optical fibre preform is provided. The method for efficiently preparing a doped optical fibre preform comprises the following steps:

(1) Mixing a rare earth material or a functional metal material with a co-doping agent in a certain proportion, and slowly adding a solvent after the above compositions are evenly stirred; promoting dissolution of the rare earth material or the functional metal material by means of a large quantity of heat released in the reaction of the co-doping agent and the solvent; making the mixture stand for 40-80 min after the mixture is completely dissolved, filtering the solution through medium speed filter paper after the mixture is cooled, and setting the volume in a required proportion after filtration to obtain a doping solution.

Figure 2:
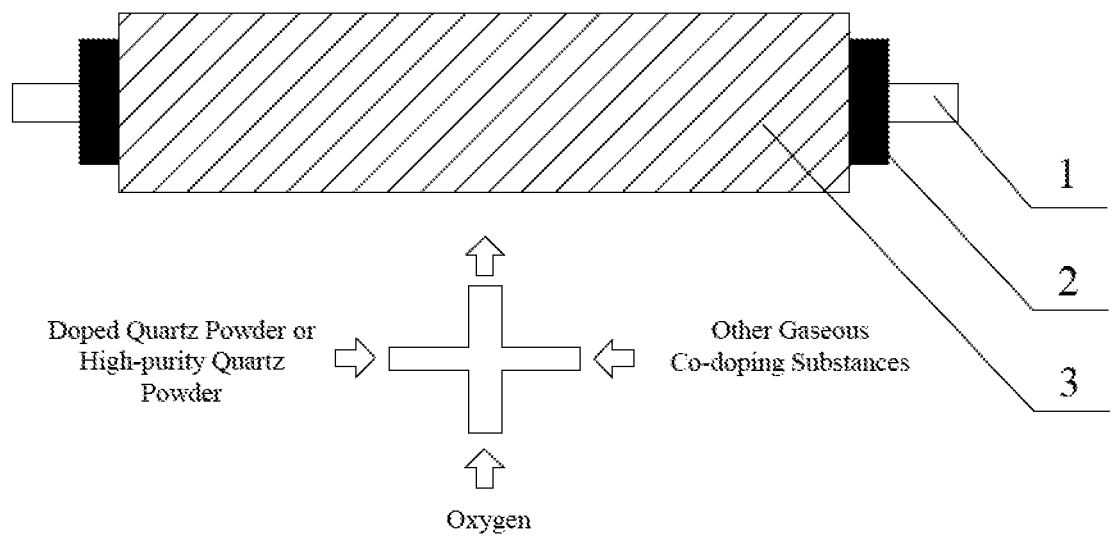
FIG. 2 is a deposition process diagram of a doped optical fibre preform in one embodiment of the invention.
Figure 3:
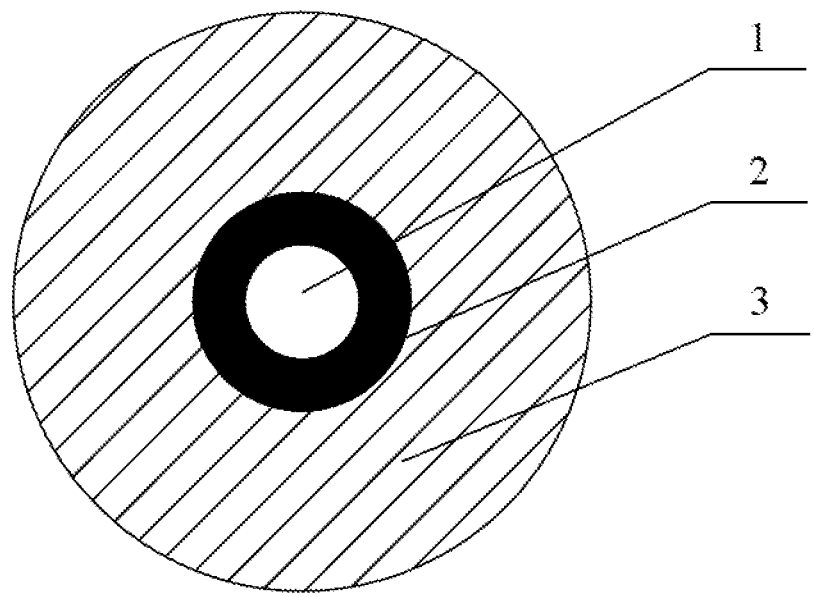
FIG. 3 is a structural diagram after the deposition process in one embodiment of the invention.
Figure 4:
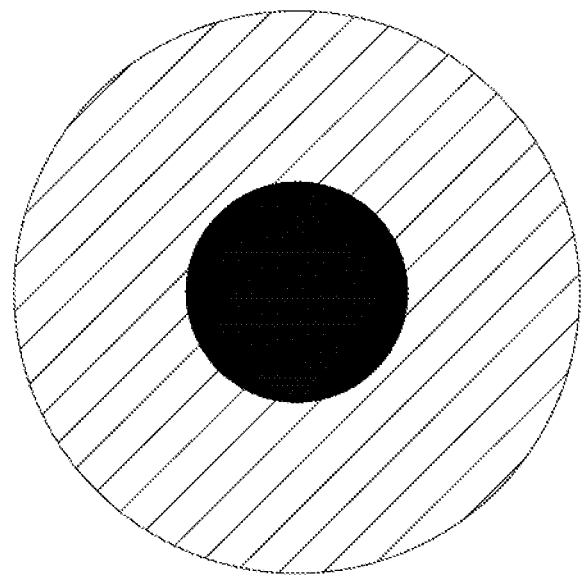
FIG. 4 is a structural diagram of a doped optical fibre preform after collapsing in one embodiment of the invention.

The rare earth material can be at least one of compounds of ytterbium, thulium, erbium, holmium, dysprosium, terbium, gadolinium, europium, samarium, promethium, neodymium, praseodymium, cerium and lanthanum, for instance, the rare earth material can be at least one of ytterbium chloride, thulium chloride and erbium chloride; the functional metal material can be at least one of the compounds of cobalt, ferrum, calcium, potassium, magnesium, vanadium, germanium and bismuth, for instance, the functional metal material can be cobalt chloride and/or ferric chloride; the co-doping agent can be at least one of aluminum chloride, cerium chloride and ferric chloride; the solvent can be water or ethyl alcohol;

(2) Screening a high-purity quartz powder with a purity of over 99% through a metal mesh sieve with 150-400 meshes, evenly mixing the undersize ultrafine high-purity quartz powder having the granularity smaller than 100 μm with the doping solution at the volume ratio of 0.2-7.0, and rapidly stirring the same through a mechanical device to form a doped precursor;

(3) Drying the doped precursor at a high temperature of 100° C.-150° C. for 12-48 hours, then mechanically crushing and grinding the doped precursor, and finally screening the doped precursor through a metal mesh sieve with 150-400 meshes to obtain a doped quartz powder;

(4) As is shown in FIG. 2, disposing a target rod 1 in a plasma outward spraying deposition device, introducing the doped quartz powder, oxygen and/or other gaseous co-doping substances into the plasma heating zone in the plasma outward spraying deposition device, and depositing the doped quartz powder onto the surface of the target rod 1 in a certain proportion to form a doped core layer 2, wherein other gaseous co-doping substances can be hexafluoroethane or phosphorus oxychloride:

As is shown in FIG. 3, after the doped core layer 2 is obtained through deposition on the target rod 1, stopping introduction of the doped quartz powder, selectively introducing the high-purity quartz powder, oxygen and/or other gaseous co-doping substances only, and depositing the high-purity quartz powder onto the surface of the doped core layer 2 in a certain proportion to form a quartz outer cladding 3; and (5) After deposition, removing the target rod 1 through a drilling process to obtain the entirety formed from the doped core layer 2 and the quartz outer cladding 3, cleaning the inner wall of the entirety, polishing the entirety with flames, and gradually collapsing the entirety formed from the doped core layer 2 and the quartz outer cladding 3 at a high temperature of 900° C.-1800° C. and a controlled pressure to form the doped optical fibre preform shown in FIG. 4.

A doped optical fibre preform is also provided. The doped optical fibre preform is prepared through the method mentioned above. In the doped optical fibre preform, the refractivity of the doped core layer 2 is greater than that of the quartz outer cladding 3, the percent of the refractivity difference is 0.1%-1.2%, and the ratio of the cross sectional area of the quartz outer cladding 3 to the cross sectional area of the doped core layer 2 is 3.0-1275.5.

Figure 5:
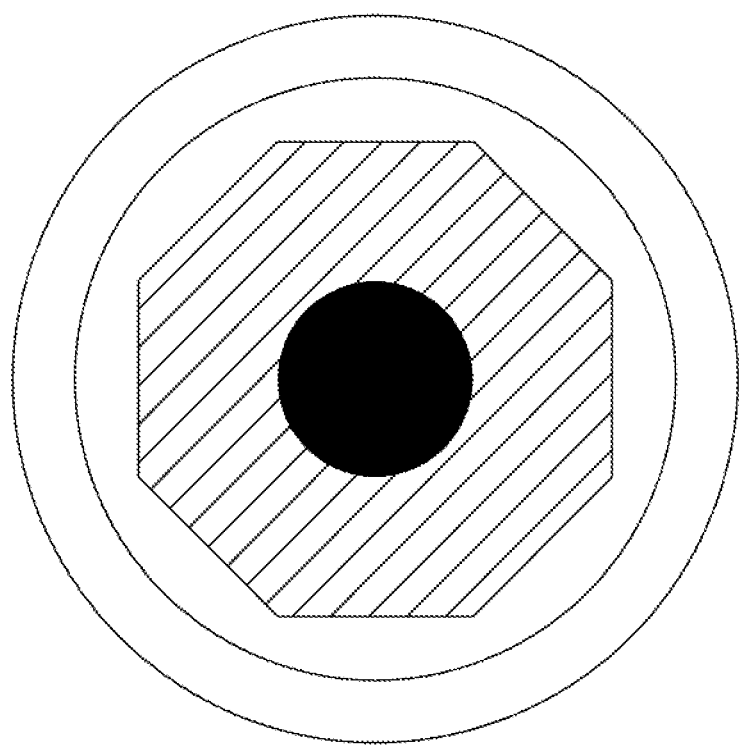
FIG. 5 is a structural diagram of the end face of a doped optical fibre in one embodiment of the invention.

The doped optical fibre preform is drawn into a doped optical fibre and then tested. The specific process is as follows:

The doped optical fibre preforms processed to a required outline, melted in a high-temperature furnace of a drawing tower at a temperature of 1800° C.-2200° C., and drawn at a drawing speed of 1.5 m/min-2200 m/min with a drawing tension of 25 g-200 g to form the doped optical fibre of the required model. As is shown in FIG. 5, the doped optical fibre sequentially comprises, from inside to outside, a fiber core (the black round zone in FIG. 5), an optical fibre cladding, an inner coating and an outer coating.

A further explanation of the invention is given through 41 specific embodiments as follows.

First Embodiment

This embodiment provides a method for efficiently preparing a doped optical fibre preform. The method comprises the following steps:

Mixing 737.28 g of ytterbium chloride hydrous crystal powder, 510.72 g of anhydrous aluminum chloride crystal powder and 71.42 g of cerium chloride hydrous crystal powder, slowly adding deionized water into the mixture after the mixture is evenly stirred, making the mixture stand for 60 min after the mixture is completely dissolved, filtering the solution through medium speed filter paper after the solution is cooled, and setting the volume to 6000 ml after filtration to obtain a doping solution;

Evenly mixing an ultrafine high-purity quartz powder screened by a 200-mesh metal sieve with the doping solution at the volume ratio of 1:5, and rapidly stilling the same through a mechanical device to form a doped precursor; drying the doped precursor at a high temperature of 150° C. for 12 hours, then mechanically crushing and grinding the doped precursor, screening the doped precursor through a 200-mesh metal sieve, and taking the undersize doped quartz powder as one of the deposition raw materials;

Gradually blanking the doped quartz powder prepared in the above process through a plasma outward spraying device, simultaneously introducing oxygen at the flow rate of 8000 ml/min and phosphorus oxychloride at the flow rate of 500 ml/min into a plasma heating zone together with the doped quartz powder, and depositing the doped quartz powder onto a target rod 1 within an area of 314.1 mm$^2$ at a set ratio to form a doped core layer 2; after the doped core layer 2 is deposited, stopping introduction of the doped quartz powder, introducing the high-purity quartz powder and oxygen at the flow rate of 12000 ml/min only and depositing the high-purity quartz powder onto the outer side of the doped core layer 2 within an area of 125349.50 mm$^2$ to form a quartz outer cladding 3; after deposition, removing the target rod 1 through a drilling process to obtain the cylindrical entirety formed from the doped core layer 2 and the quartz outer cladding 3, cleaning the inner wall of the entirety, then polishing the entirety with flames, and afterwards, gradually collapsing the entirety at a high temperature of 1700° C. and a controlled pressure to form the ytterbium-doped optical fibre preform.

The ytterbium-doped optical fibre preform is drawn into an optical fibre and then tested. The specific process is as follows:

The ytterbium-doped optical fibre preform is processed into an octagonal structure, then melted in a high-temperature furnace of a drawing tower at a temperature of 1950° C. and finally drawn at a drawing speed of 25 m/min with a drawing tension of 150 g to form a ytterbium-doped optical fibre (20/400 ytterbium-doped optical fibre) with a cladding diameter of 402 μm and a coating diameter of 564 μm. The key test indicators of the optical fibre are shown in Table 1.

TABLE 1

Test Results of the 20/400 Ytterbium-doped Optical Fibre

| | Item | Indicator Range | Unit |
|---|---|---|---|
| Optical Performance | Operating Wavelength | 1070 | nm |
| | Core Numerical Aperture | 0.065 | — |
| | Cladding Numerical Aperture | 0.47 | — |
| | 1064 nm Attenuation | 0.02 | dB/m |
| | Slope Efficiency | 72 | % |
| | Cladding Absorptivity | 0.41 (915 nm) | dB/m |
| Geometric Parameters | Cladding Diameter (edge to edge) | 402 | μm |
| | Core Diameter | 20.2 | μm |
| | Coating Diameter | 564 | μm |
| | Core Cladding Concentricity | 1.4 | μm |
| | Paint Type of Inner Cladding | Low-refractivity Paint | — |

Second Embodiment

This embodiment provides a method for efficiently preparing a doped optical fibre preform. The method comprises the following steps:

Mixing 481.32 g of thulium chloride hydrous crystal powder and 574.56 g of anhydrous aluminum chloride crystal powder, slowly adding deionized water into the mixture after the mixture is evenly stirred, making the mixture stand for 40 min after the mixture is completely dissolved, filtering the solution through medium speed filter paper after the solution is cooled, and setting the volume to 6000 ml after filtration to obtain a doping solution.

Evenly mixing an ultrafine high-purity quartz powder screened by a 200-mesh metal sieve with the doping solution at the volume ratio of 6:1, and rapidly stirring the same through a mechanical device to form a doped precursor; drying the doped precursor at a high temperature of 150° C. for 48 hours, then mechanically crushing and grinding the doped precursor, screening the doped precursor through a 150-mesh metal sieve, and taking the undersize doped quartz powder as one of the deposition raw materials;

Gradually blanking the doped quartz powder prepared in the above process through a plasma outward spraying device, introducing oxygen at the flow rate of 9500 ml/min and hexatluoroethane at the flow rate of 700 ml/min into a plasma heating zone together with the doped quartz powder, and depositing the doped quartz powder onto a target rod 1 within an area of 490.87 mm² at a set ratio to form a doped core layer 2; after the doped core layer 2 is deposited, stopping introduction of the doped quartz powder, introducing the high-purity quartz powder and oxygen at the flow rate of 12000 ml/min only, and depositing the high-purity quartz powder onto the outer side of the doped core layer 2 within an area of 125172.80 mm² to form a quartz outer cladding 3: after deposition, removing the target rod 1 through a drilling process to obtain the cylindrical entirety formed from the doped core layer 2 and the quartz outer cladding 3, cleaning the inner wall of the entirety, then polishing the entirety with flames, and afterwards, gradually collapsing the entirety at a high temperature of 1750° C. and a controlled pressure to form the thulium-doped optical fibre preform.

The thulium-doped optical fibre preform is drawn into an optical fibre and then tested. The specific process is as follows:

The thulium-doped optical fibre preform is processed into an octagonal structure, then melted in a high-temperature furnace of a drawing tower at a temperature of 2100° C., and finally drawn at a drawing speed of 12 ml/min with a drawing tension of 80 g to form a thulium-doped optical fibre (25/400 thulium-doped optical fibre) with a cladding diameter of 401 μm and a coating diameter of 568 μm. The key test indicators of the optical fibre are shown in Table 2.

TABLE 2

Test Results of the 25/400 Thulium-doped Optical fibre

| | Item | Indicator Range | Unit |
|---|---|---|---|
| Optical Performance | Operating Wavelength | 1985 | nm |
| | Core Numerical Aperture | 0.092 | — |
| | Cladding Numerical Aperture | 0.46 | — |
| | 1064 nm Attenuation | 0.03 | dB/m |
| | Slope Efficiency | 41 | % |
| | Cladding Absorptivity | 1.67 (793 nm) | dB/m |
| Geomettic Parameters | Cladding Diameter (edge to edge) | 401 | μm |
| | Core Diameter | 25.5 | μm |
| | Coating Diameter | 568 | μm |
| | Core Cladding Concentricity | 1.6 | μm |
| | Paint Type of Inner Cladding | Low-refractivity Paint | — |

Third Embodiment

This embodiment provides a method for efficiently preparing a doped optical fibre preform. The method comprises the following steps:

Mixing 212.94 g of cobalt chloride hydrous crystal powder, 438.90 g of anhydrous aluminum chloride crystal powder and 167.10 g of spectral-purity ferric chloride powder, slowly adding deionized water into the mixture after the mixture is evenly stirred, making the mixture stand for 80 min after the mixture is completely dissolved, filtering the solution through medium speed filter paper after the solution is cooled, and setting the volume to 6000 ml after filtration to obtain a doping solution;

Evenly mixing an ultrafine high-purity quartz powder screened by a 200-mesh metal sieve with the doping solution at the volume ratio of 7:1, and rapidly stirring the same through a mechanical device to form a doped precursor; drying the doped precursor at a high temperature of 100° C. for 48 hours, them mechanically crushing and grinding the doped precursor, screening the doped precursor through a 300-mesh metal sieve, and taking the undersize doped quartz powder as one of deposition raw materials;

Gradually blanking the doped quartz powder prepared in the above process through a plasma outward spraying device, introducing oxygen at the flow rate of 8200 ml/min into a plasma heating zone together with the doped quartz powder, and depositing the doped quartz powder onto a target rod 1 within an area of 63.62 mm$^2$ at a set ratio to form a doped core layer 2; after the doped core layer 2 is deposited, stopping introduction of the doped quartz powder, introducing the high-purity quartz powder and oxygen at the flow rate of 12000 ml/min only, and depositing the high-purity quartz powder onto the outer side of the doped core layer 2 within an area of 12208.21 mm$^2$ to form a quartz outer cladding 3; after deposition, removing the target rod 1 through a drilling process to obtain the cylindrical entirety formed from the doped core layer 2 and the quartz outer cladding 3, cleaning the inner wall of the entirety, then polishing the entirety with flames, and afterwards, gradually collapsing the entirety at a high temperature of 1500° C. and a controlled pressure to form the high-attenuation doped optical fibre preform.

The high-attenuation optical fibre preform is drawn into an optical fibre and then tested. The specific process is as follows:

The high-attenuation optical fibre preform is processed into an octagonal structure, then melted in a high-temperature furnace of a drawing tower at a temperature of 2200° C., and finally drawn at a drawing speed of 1700 ml/min with a drawing tension of 180 g to form a high-attenuation optical fibre which has a cladding diameter of 125.2 μm and a coating diameter of 246 μm and serves as the key component of an attenuator. The key test indicators of the optical fibre are shown in Table 3.

TABLE 3

Test Results of the High-attenuation Optical fibre

| | Item | Indicator Range | Unit |
|---|---|---|---|
| Optical Performance | Operating Wavelength | 1550 | nm |
| | Core Numerical Aperture | 0.14 | — |
| | Attenuation Performance | 170 (1550 nm) | dB/m |
| | | 192 (1310 nm) | dB/m |
| Geometric Parameters | Cladding Diameter | 125.2 | μm |
| | Core Diameter | 9.04 | μm |
| | Coating Diameter | 246 | μm |

Fourth Embodiment

This embodiment provides a method for efficiently preparing a doped optical fibre preform. The method comprises the following steps:

Mixing 737.28 g of ytterbium chloride hydrous crystal powder, 766.08 g of anhydrous aluminum chloride crystal powder and 458.40 g of erbium chloride hydrous crystal powder, slowly adding ethyl alcohol into the mixture after the mixture is evenly stirred, making the mixture stand for 80 min after the mixture is completely dissolved, filtering the solution through medium speed filter paper after the solution is cooled, and setting the volume to 6000 ml after filtration to obtain a doping solution;

Evenly mixing an ultra fine high-purity quartz powder screened by a 200-mesh metal sieve with the doping solution at the volume ratio of 1:1, and rapidly stirring the same through a mechanical device to form a doped precursor; drying the doped precursor at a high temperature of 120° C. for 24 hours, then mechanically crushing and grinding the doped precursor, screening the doped precursor through a 200-mesh metal sieve, and taking the undersize doped quartz powder as one of deposition raw materials;

Gradually blanking the doped quartz powder prepared in the above process through a plasma outward spraying device, introducing oxygen at the flow rate of 9500 ml/min into a plasma heating zone together with the doped quartz powder, and depositing the doped quartz powder onto a target rod 1 within an area of 314.16 mm$^2$ at a set ratio to form a doped core layer 2; after the doped core layer 2 is deposited, stopping introduction of the doped quartz powder, introducing the high-purity quartz powder and oxygen at the flow rate of 12000 ml/min only, and depositing the high-purity quartz powder onto the outer side of the doped core layer 2 within an area of 125349.50 mm$^2$ to form a quartz outer cladding 3; after deposition, removing the target rod 1 through a drilling process to obtain the cylindrical entirety formed from the doped core layer 2 and the quartz outer cladding 3, cleaning the inner wall of the entirety, then polishing the entirety with flames, afterwards, gradually collapsing the entirety at a high temperature of 1700° C. and a controlled pressure to form an erbium-ytterbium co-doped optical fibre preform, and sleeving the preform on this basis to make sure that the ratio of the core diameter to the cladding diameter on the cross section of the optical fibre preform is 1:43.72.

The erbium-ytterbium co-doped optical fibre preform is drawn into an optical fibre and then tested. The specific process is as follows:

The erbium-ytterbium co-doped optical fibre preform is melted in a high-temperature furnace of a drawing tower at a temperature of 1950° C., and drawn at a drawing speed of 70 m/min with a drawing tension of 120 g to form an ytterbium-doped optical fibre (erbium-ytterbium co-doped optical fibre) which has a cladding diameter of 125 μm and coating diameter of 245 μm. The key test indicators of the optical fibre are shown in Table 4.

TABLE 4

Test Results of the Erbium-ytterbium Co-doped Optical fibre

| | Item | Indicator Range | Unit |
|---|---|---|---|
| Optical Performance | Optical fibre Type | EYDF-6/125-HE | — |
| | Operating Wavelength | 1530-1625 | nm |
| | Core Numerical Aperture | 0.22 | — |
| | Mode Field Diameter | 6.9 (1550 nm) | nm |
| | Cut-off Wavelength | 1340 | nm |
| | Absorption Coefficient | 31.0 (about 1535 nm) | dB/m |
| | | 0.87 (about 915 nm) | dB/m |
| Geometric Parameters | Cladding Diameter | 124.6 | μm |
| | Core Diameter | 6.8 | μm |
| | Coating Diameter | 247 | μm |
| | Cladding Concentricity | 0.3 | μm |

Fifth Embodiment

Mixing 737.28 g of holmium chloride hydrous crystal powder, 71.42 g of cerium chloride hydrous crystal powder and 167.10 g of spectral-purity ferric chloride powder, slowly adding deionized water into the mixture after the mixture is evenly stirred, making the mixture stand for 60 min after the mixture is completely dissolved, filtering the solution through medium speed filter paper after the solution is cooled, acid setting the volume to 6000 ml after filtration to obtain a doping, solution;

Evenly mixing an ultrafine high-purity quartz powder screened by a 150-mesh metal sieve with the doping solution at the volume ratio of 1:5, and rapidly stirring the same through a mechanical device to form a doped precursor; drying the doped precursor at a high temperature of 150'C for 12 hours, then mechanically crushing and grinding the doped precursor, screening, the doped precursor through a 150-mesh metal sieve, and taking the undersize doped quartz powder as one of deposition raw materials;

Gradually blanking the doped quartz powder prepared in the above process through a plasma outward spraying, device, simultaneously introducing oxygen at the flow rate of 8000 ml/min and phosphorus oxychloride at the flow rate of 500 ml/min into a plasma heating zone together with the doped quartz powder, and depositing the doped quartz powder onto a target rod 1 within an area of 314.16 mm$^2$ at a set ratio to form a doped core layer 2; after the doped core layer 2 is deposited, stopping introduction of the doped quartz powder, introducing the high-purity quartz powder and oxygen at the flow rate of 12000 ml/min only, and depositing the high-purity quartz powder onto the outer side of the doped core layer 2 within an area of 125349.50 mm$^2$ to form a quartz outer cladding 3; after deposition, removing the target rod 1 through a drilling process to obtain the cylindrical entirety formed from the doped core layer 2 and the quartz outer cladding 3, cleaning the inner wall of the entirety, then polishing the entirety with flames, afterwards, and gradually collapsing the entirety at a high temperature of 900° C. and a controlled pressure to form the ytterbium-doped optical fibre preform.

Sixth Embodiment

Mixing 737.28 g of dysprosium chloride hydrous crystal powder and 71.42 g of cerium chloride hydrous crystal powder, slowly adding deionized water into the mixture after the mixture is evenly stirred, making the mixture stand for 60 min after the mixture is completely dissolved, filtering the solution through medium speed filter paper after the solution is cooled, and setting the volume to 6000 ml after filtration to obtain a doping solution;

Evenly mixing an ultrafine high-purity quartz powder screened by a 400-mesh metal sieve with the doping solution at the volume ratio of 1:5, and rapidly stirring the same through a mechanical device to form a doped precursor; drying the doped precursor at a high temperature of 150° C. for 12 hours, then mechanically crushing and grinding the doped precursor screening the doped precursor through a 400-mesh metal sieve, and taking the undersize doped quartz powder as one of deposition raw materials;

Gradually blanking the doped quartz powder prepared in the above process through a plasma outward spraying device, simultaneously introducing oxygen at the flow rate of 8000 ml/min and phosphorus oxychloride at the flow rate of 500 ml/min into a plasma heating zone together with the doped quartz powder, and depositing the doped quartz powder onto a target rod 1 within an area of 314.16 mm$^2$ at a set ratio to form a doped core layer 2; after the doped core layer 2 is deposited, stopping introduction of the doped quartz powder, introducing the high-purity quartz powder and oxygen at the flow rate of 12000 ml/min only, and depositing the high-purity quartz powder onto the outer side of the doped core layer 2 within an area of 125349.50 mm$^2$ to form a quartz outer cladding 3; after deposition, removing the target rod 1 through a drilling process to obtain the cylindrical entirety formed from the doped core layer 2 and the quartz outer cladding 3, cleaning the inner wall of the entirety, then polishing the entirety with flames, afterwards, and gradually collapsing the entirety at a high temperature of 1.000° C. and a controlled pressure to form the ytterbium-doped optical fibre preform.

Seventh Embodiment

Mixing and evenly stirring 737.28 g of terbium chloride hydrous crystal powder and 167.10 g of spectral-purity ferric chloride powder, slowly adding deionized water into the mixture after the mixture is evenly stirred, making the mixture stand for 60 min after the mixture is completely dissolved, filtering the solution through medium speed filter paper after the solution is cooled, and setting the volume to 6000 ml after filtration to obtain a doping solution;

Evenly mixing an ultrafine high-purity quartz powder screened by a 400-mesh metal sieve with the doping solution at the volume ratio of 1:5, and rapidly stirring the same through a mechanical device to form a doped precursor; drying the doped precursor at a high temperature of 150° C. for 12 hours, then mechanically crushing and grinding the doped precursor, screening the doped precursor through a 400-mesh metal sieve, and taking the undersize doped quartz powder as one of deposition materials;

Gradually blanking the doped quartz powder prepared in the above process through a plasma outward spraying device, simultaneously introducing oxygen at the flow rate of 8000 ml/min and phosphorus oxychloride at the flow rate of 500 ml/min into a plasma heating zone together with the doped quartz powder, and depositing the doped quartz powder onto a target rod 1 within an area of 314.16 mm$^2$ at a set ratio to form a doped core layer 2 after the doped core layer 2 is deposited, stopping introduction of the doped quartz powder, introducing the high-purity quartz powder and oxygen at the flow rate of 12000 ml/min only, and depositing the high-purity quartz powder onto the outer side of the doped core layer 2 within an area of 125349.50 mm$^2$ to form a quartz outer cladding 3; after deposition, removing the target rod 1 through a drilling process to obtain the cylindrical entirety formed from the doped core layer 2 and the quartz outer cladding 3, cleaning the inner wall of the entirety, then polishing the entirety with flames, and afterwards, gradually collapsing the entirety at a high temperature of 1200° C. and a controlled pressure to form the ytterbium-doped optical fibre preform.

Eighth Embodiment

Except for the rare earth material and, by mass, 737.28 g of gadolinium chloride hydrous crystal powder thereof, this embodiment is the same as the second embodiment.

Ninth Embodiment

Except for the rare earth material and, by mass, 737.28 g of europium chloride hydrous crystal powder thereof, this embodiment is the same as the second embodiment.

Tenth Embodiment

Except for the rare earth material and, by mass, 737.28 g of samarium chloride hydrous crystal powder thereof, this embodiment is the same as the second embodiment.

Eleventh Embodiment

Except for the rare earth material and, by mass, 737.28 g of promethium chloride hydrous crystal powder thereof, this embodiment is the same as the second embodiment.

Twelfth Embodiment

Except for the rare earth material and, by mass, 737.28 g of neodymium chloride hydrous crystal powder thereof, this embodiment is the same as the second embodiment.

Thirteenth Embodiment

Except for the rare earth material and, by mass, 737.28 g of praseodymium chloride hydrous crystal powder thereof, this embodiment is the same as the second embodiment.

Fourteenth Embodiment

Except for the rare earth material and, by mass, 737.28 g of cerium nitrate hydrous crystal powder thereof, this embodiment is the same as the second embodiment.

Fifteenth Embodiment

Except for the rare earth material and, by mass, 737.28 g of lanthanum nitrate hydrous crystal powder thereof, this embodiment is the same as the second embodiment.

Sixteenth Embodiment

Except for the rare earth material and, by mass, 737.28 g of ytterbium chloride hydrous crystal powder and 458.40 g of thulium chloride hydrous crystal powder thereof, this embodiment is the same as the fourth embodiment.

Seventeenth Embodiment

Except for the rare earth material and, by mass, 737.28 g of holmium chloride hydrous crystal powder and 458.40 g of dysprosium chloride hydrous crystal powder thereof, this embodiment is the same as the fourth embodiment.

Eighteenth Embodiment

Except for the rare earth material and, by mass, 737.28 of gadolinium chloride hydrous crystal powder and 458.40 g of neodymium chloride hydrous crystal powder thereof, this embodiment is the same as the fourth embodiment.

Nineteenth Embodiment

Except for the rare earth material and, by mass, 737.28 g of praseodymium chloride hydrous crystal powder and 458.40 g of lanthanum chloride hydrous crystal powder thereof, this embodiment is the same as the fourth embodiment.

Twentieth Embodiment

Except for the rare earth material and, by mass, 737.28 g of terbium chloride hydrous crystal powder and 458.40 g of promethium chloride hydrous crystal powder thereof, this embodiment is the same as the fourth embodiment.

Twenty-First Embodiment

Except for the rare earth material and, by mass, 737.28 g of europium chloride hydrous crystal powder, 458.40 g of lanthanum chloride hydrous crystal powder and 458.40 g of thulium chloride hydrous crystal powder thereof, this embodiment is the same as the fourth embodiment.

Twenty-Second Embodiment

Except for the rare earth material and, by mass, 737.28 g of ytterbium chloride hydrous crystal powder, 458.40 g of holmium chloride hydrous crystal powder and 458.40 g of thulium chloride hydrous crystal powder thereof, this embodiment is the same as the fourth embodiment.

Twenty-Third Embodiment

Except for the rare earth material and, by mass, 737.28 g of dysprosium chloride hydrous crystal powder, 458.40 g of europium chloride hydrous crystal powder and 458.40 g of neodymium chloride hydrous crystal powder thereof, this embodiment is the same as the fourth embodiment.

Twenty-Fourth Embodiment

Except for the rare earth material and, by mass, 737.28 g of dysprosium chloride hydrous crystal powder, 458.40 g of europium chloride hydrous crystal powder, 458.40 g of neodymium chloride hydrous crystal powder and 458.4 0 g of lanthanum chloride hydrous crystal powder thereof, this embodiment is the same as the fourth embodiment.

Twenty-Fifth Embodiment

Except for the rare earth material and, by mass, 737.28 g of ytterbium chloride hydrous crystal powder, 458.40 g of erbium chloride hydrous crystal powder, 458.40 g of neodymium chloride hydrous crystal powder and 458.40 g of cerium chloride hydrous crystal powder thereof, this embodiment is the same as the fourth embodiment.

Twenty-Sixth Embodiment

Except for the functional metal material and, by mass, 212.94 g of ferric chloride hydrous crystal powder thereof, this embodiment is the same as the third embodiment.

Twenty-Seventh Embodiment

Except for the functional metal material and, by mass, 212.94 g of calcium chloride hydrous crystal powder thereof, this embodiment is the same as the third embodiment.

Twenty-Eighth Embodiment

Except for the functional metal material and, by mass, 212.94 g of potassium chloride hydrous crystal powder thereof, this embodiment is the same as the third embodiment.

Twenty-Ninth Embodiment

Except for the functional metal material and, by mass, 212.94 g of magnesium chloride hydrous crystal powder thereof, this embodiment is the same as the third embodiment.

Thirtieth Embodiment

Except for the functional metal material and, by mass, 212.94 g of vanadium chloride hydrous crystal powder thereof, this embodiment is the same as the third embodiment.

Thirty-First Embodiment

Except for the functional metal material and, by mass, 212.94 g of germanium chloride hydrous crystal powder thereof, this embodiment is the same as the third embodiment.

Thirty-Second Embodiment

Except for the functional metal material and, by mass, 212.94 g of bismuth chloride hydrous crystal powder thereof, this embodiment is the same as the third embodiment.

Thirty-Third Embodiment

Except for the functional metal material and, by mass, 212.94 g of cobalt chloride hydrous crystal powder and 212.94 g of ferric chloride hydrous crystal powder thereof, this embodiment is the same as the third embodiment.

Thirty-Fourth Embodiment

Except for the functional metal material and, by mass, 212.94 g of potassium chloride hydrous crystal powder and 212.94 g of magnesium chloride hydrous crystal powder thereof, this embodiment is the same as the third embodiment.

Thirty-Fifth Embodiment

Except for the functional metal material and, by mass, 212.94 g of vanadium chloride hydrous crystal powder and 212.94 g of germanium chloride hydrous crystal powder thereof, this embodiment is the same as the third embodiment.

Thirty-Sixth Embodiment

Except for the functional metal material and, by mass, 212.94 g of vanadium chloride hydrous crystal powder and 212.94 g of bismuth chloride hydrous crystal powder thereof, this embodiment is the same as the third embodiment.

Thirty-Seventh Embodiment

Except for the functional metal material and, by mass, 212.94 g of cobalt chloride hydrous crystal powder and 212.94 g of vanadium chloride hydrous crystal powder thereof, this embodiment is the same as the third embodiment.

Thirty-Eighth Embodiment

Except for the functional metal material and, by mass, 212.94 g of calcium chloride hydrous crystal powder and 212.94 g of germanium chloride hydrous crystal powder thereof, this embodiment is the same as the third embodiment.

Thirty-Ninth Embodiment

Except for the functional metal material and, by mass, 212.94 g of calcium chloride hydrous crystal powder, 212.94 g of germanium chloride hydrous crystal powder and 212.94 g of vanadium chloride hydrous crystal powder thereof, this embodiment is the same as the third embodiment.

Fortieth Embodiment

Except for the functional metal material and, by mass, 212.94 g of calcium chloride hydrous crystal powder, 212.94 g of cobalt chloride hydrous crystal powder and 212.94 g of ferric chloride hydrous crystal powder thereof, this embodiment is the same as the third embodiment.

Forth-First Embodiment

Except for the functional metal material and, by mass, 212.94 g of calcium chloride hydrous crystal powder, 212.94 g of magnesium chloride hydrous crystal powder, 217.94 g of germanium chloride hydrous crystal powder and 212.94 g of bismuth chloride hydrous crystal powder thereof, this embodiment is the same as the third embodiment.

Various modifications and variations of the embodiments can be made by those skilled in the field, and these modifications and variations within the scope of the claims of the invention and equivalent techniques should be within the protection scope of the invention.

Content not explained in detail in the description is the prior art known to those skilled in the field.

What is claimed is:

1. A method for efficiently preparing a doped optical fibre preform, the method comprising the following steps:

S1, mixing a rare earth material or a functional metal material with a co-doping agent in a certain proportion, and adding a solvent to formulate a doping solution; mixing and evenly stirring a high-purity quartz powder having a purity of over 99% with the doping solution to obtain a doped precursor; drying the doped precursor at a temperature of 100° C.-150° C. for 12-48 hours, crushing the doped precursor, and screening the crushed precursor through a mesh sieve with over 150 meshes to obtain a doped quartz powder;

S2, disposing a target rod in a plasma outward spraying deposition device, introducing the doped quartz powder, oxygen and/or other gaseous co-doping substances into a plasma heating zone in the plasma outward spraying deposition device, and depositing the doped quartz powder onto the surface of the target rod in a certain proportion to form a doped core layer; stopping introduction of the doped quartz powder, introducing the high-purity quartz powder, oxygen and/or other gaseous co-doping substances, and depositing the high-purity quartz powder onto the surface of the doped core layer in a predetermined proportion to form a quartz outer cladding; and S3, removing the target rod, and gradually collapsing the entirety formed from the doped core layer and the quartz outer cladding at a high temperature of 900° C.-1800° C. to obtain the doped optical fibre preform.

2. The method for efficiently preparing a doped optical fibre preform according to claim 1, wherein the rare earth material is at least one selected from the group consisting of compounds of ytterbium, thulium, erbium, holmium, dysprosium, terbium, gadolinium, europium, samarium, promethium, neodymium, praseodymium, cerium and lanthanum.

3. The method for efficiently preparing a doped optical fibre preform according to claim 2, wherein the rare earth material is at least one selected from the group consisting of ytterbium chloride, thulium chloride and erbium chloride.

4. The method for efficiently preparing a doped optical fibre preform according to claim 1, wherein the functional metal material is at least one selected from the group consisting of compounds of cobalt, ferrum, calcium, potassium, magnesium, vanadium, germanium and bismuth.

5. The method for efficiently preparing a doped optical fibre preform according to claim 4, wherein the functional metal material is cobalt chloride and/or ferric chloride.

6. The method for efficiently preparing a doped optical fibre preform according to claim 1, wherein the co-doping agent is at least one selected from the group consisting of aluminum chloride, cerium chloride and ferric chloride.

7. The method for efficiently preparing a doped optical fibre preform according to claim 1, wherein the granularity of the high-purity quartz powder is smaller than 100 µm.

8. The method for efficiently preparing a doped optical fibre preform according to claim 1, wherein the other gaseous co-doping substances are hexafluoroethane or phosphorus oxychloride.

9. The method for efficiently preparing a doped optical fibre preform according to claim 1, wherein the solvent in step S1 is water or ethyl alcohol.

10. A doped optical fibre preform, prepared through the method according to claim 1.

11. The doped optical fibre preform according to claim 10, wherein a refractivity of a doped core layer is greater than that of a quartz outer cladding, and a percentage of the refractivity difference is 0.1%-1.2%.

12. The doped optical fibre preform according to claim 10, wherein a ratio of a cross sectional area of a quartz outer cladding to the cross sectional area of a doped core layer is 3.0-1275.5.

* * * * *